United States Patent
Signorelli et al.

(10) Patent No.: US 10,109,143 B2
(45) Date of Patent: *Oct. 23, 2018

(54) SYSTEMS AND METHODS FOR WIRELESS AUTHORIZATION AT A VENDING MACHINE

(71) Applicant: Inventor Holdings, LLC, Stamford, CT (US)

(72) Inventors: Paul D. Signorelli, Ridgefield, CT (US); Sih Y. Lee, Northvale, NJ (US); Paul T. Breitenbach, Wilton, CT (US); Daniel E. Tedesco, Shelton, CT (US); Dean P. Alderucci, Westport, CT (US)

(73) Assignee: Inventor Holdings, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/874,256

(22) Filed: Jan. 18, 2018

(65) Prior Publication Data

US 2018/0144575 A1 May 24, 2018

Related U.S. Application Data

(63) Continuation of application No. 13/365,962, filed on Feb. 3, 2012, now Pat. No. 9,911,267, which is a continuation of application No. 11/376,488, filed on Mar. 15, 2006, now Pat. No. 8,774,963.

(60) Provisional application No. 60/662,139, filed on Mar. 15, 2005.

(51) Int. Cl.
*G07F 11/00* (2006.01)
*G06Q 20/20* (2012.01)
*G07F 9/02* (2006.01)

(52) U.S. Cl.
CPC .......... *G07F 11/002* (2013.01); *G06Q 20/20* (2013.01); *G07F 9/026* (2013.01)

(58) Field of Classification Search
CPC ........ G07F 11/002; G07F 9/206; G06Q 20/20
USPC .......................................................... 700/237
See application file for complete search history.

(56) References Cited

U.S. PATENT DOCUMENTS

| | | |
|---|---|---|
| 5,608,643 A | 3/1997 | Wichter et al. |
| 5,822,216 A | 10/1998 | Satchell, Jr. et al. |
| 6,038,491 A | 3/2000 | McGarry |
| 6,324,520 B1 | 11/2001 | Walker et al. |
| 6,397,193 B1 | 5/2002 | Walker et al. |
| 6,584,309 B1 | 6/2003 | Whigham |
| 6,721,400 B2 | 4/2004 | Schelberg, Jr. |
| 6,784,874 B1 | 8/2004 | Shimizu |
| 6,850,816 B2 | 2/2005 | Garratt |
| 7,079,922 B2 | 7/2006 | Komai |
| 7,110,792 B2 | 9/2006 | Rosenberg |
| 7,110,954 B2 | 9/2006 | Yung et al. |
| 7,127,236 B2 | 10/2006 | Khan |

(Continued)

OTHER PUBLICATIONS

Office Communication, (Examiner's Answer before the BPAI) for U.S. Appl. No. 11/376,488, dated Mar. 21, 2011, 25 pp.

(Continued)

*Primary Examiner* — Michael Collins
(74) *Attorney, Agent, or Firm* — Fincham Downs, LLC; Carson C. K. Fincham

(57) ABSTRACT

Some embodiments are associated with wireless payment or account verification or authorization for purchases made from a vending machine via a customer's mobile device.

18 Claims, 5 Drawing Sheets

(56) References Cited

U.S. PATENT DOCUMENTS

| | | | |
|---|---|---|---|
| 7,167,892 B2 | 1/2007 | Defosse | |
| 7,185,204 B2 | 2/2007 | Narayanaswami et al. | |
| 7,268,818 B2 | 9/2007 | Karasawa | |
| 7,835,942 B1 | 11/2010 | Pavlic et al. | |
| 8,774,963 B2 * | 7/2014 | Signorelli | G06Q 20/20 700/232 |
| 9,911,267 B2 * | 3/2018 | Signorelli et al. | G07F 11/002 700/237 |
| 2002/0128932 A1 | 9/2002 | Yung et al. | |
| 2003/0074106 A1 | 4/2003 | Butler | |
| 2004/0249711 A1 | 12/2004 | Walker et al. | |
| 2005/0171634 A1 | 8/2005 | York | |
| 2005/0228720 A1 | 10/2005 | Pavlic et al. | |
| 2005/0240304 A1 | 10/2005 | York | |
| 2006/0182241 A1 | 8/2006 | Schelberg, Jr. | |

OTHER PUBLICATIONS

Office Action for U.S. Appl. No. 11/376,488, dated Jul. 20, 2010, 17 pp.

Office Action for U.S. Appl. No. 11/376,488, dated Dec. 9, 2009, 17 pp.

Office Action for U.S. Appl. No. 11/376,488, dated Dec. 12, 2008, 16 pp.

Office Action for U.S. Appl. No. 11/376,488, dated Apr. 17, 2008, 9 pp.

Office Action for U.S. Appl. No. 11/376,488, dated Jun. 30, 2008, 9 pp.

Interview for U.S. Appl. No. 11/376,488, dated Jan. 11, 2008, 2 pp.

Office Action for U.S. Appl. No. 11/376,488, dated Oct. 9, 2007, 9 pp.

Office Action for U.S. Appl. No. 11/376,488, dated May 16, 2007, 9 pp.

Office Action for U.S. Appl. No. 13/365,962 dated Aug. 29, 2012; 8 pp.

Office Action for U.S. Appl. No. 13/365,962 dated Mar. 15, 2013; 10 pp.

Final Office Action for U.S. Appl. No. 13/365,962 dated Jan. 3, 2014; 13 pp.

Notice of Allowance for U.S. Appl. No. 13/365,962 dated Oct. 25, 2017; 5 pp.

* cited by examiner

SYSTEMS AND METHODS FOR WIRELESS AUTHORIZATION AT A VENDING MACHINE

CROSS-REFERENCE TO RELATED APPLICATIONS

The present application claims benefit and priority under 35 U.S.C. § 120 to, and is a continuation of, U.S. application Ser. No. 13/365,962 filed Feb. 3, 2012 and titled "SYSTEMS AND METHODS FOR PROVIDING NETWORK ACCESS" which itself claims benefit and priority to and is a continuation of U.S. application Ser. No. 11/376,488 filed Mar. 15, 2006 and titled "SYSTEMS AND METHODS FOR PROVIDING NETWORK ACCESS", which issued as U.S. Pat. No. 8,774,963 on Jul. 8, 2014, and which itself claims benefit and priority to U.S. Provisional Patent Application Ser. No. 60/662,139, titled "WI-FI VENDING MACHINE" and filed on Mar. 15, 2005, the entirety of each such previous application being hereby incorporated by reference herein.

The present application is also related to U.S. patent application Ser. No. 14/317,789 titled "SYSTEMS AND METHODS FOR PROVIDING NETWORK ACCESS" filed Jun. 27, 2014.

BACKGROUND

Significant resources are often spent creating wired and Wireless Access Points (WAPs) to the Internet for the purpose of giving more and more electronic devices Internet connectivity. Notable in this endeavor is the emergence of "Wi-Fi", wireless broadband connection to the Internet. Companies ranging from start-ups (such as Boingo® and Cometa Networks™) to large telecommunications companies (such as Sprint™ and AT&T™) are developing WAPs to the Internet called "hot spots" (or "Wi-Fi" hot spots).

A hotspot typically consists of computer hardware and software capable of (1) wirelessly communicating with a user's personal mobile device (laptop computer, Personal Digital Assistant (PDA), cell phone, etc.), and (2) connecting to the Internet (or other communications network). The wireless connection between the hotspot and the personal mobile devices within the vicinity is typically established via a wireless router, such as a wireless router operating pursuant to the Fast Ethernet LAN transmission standard 802.3-2002® published by the Institute of Electrical and Electronics Engineers (IEEE) and/or the Wireless LAN transmission standard 802.11B/G-1999/2003® published by the IEEE. The connection to the Internet or other communications network is generally wired (e.g., via Digital Subscriber Line (DSL), cable modem, T1).

Access to the Internet via the hotspot router generally requires a valid user account within the provider's network. Users pay subscription fees, either monthly, or as service is used. For example, unlimited access on the Boingo® network is currently priced between twenty-one dollars and ninety-five cents ($21.95) to thirty-nine dollars and ninety-five cents ($39.95) per month, or one can buy a two-day (2-day) subscription for seven dollars and ninety-five cents ($7.95). I-Mobile® charges nineteen dollars and ninety-five cents ($19.95) per month.

A goal of companies who provide or facilitate WAPs, or "Wi-Fi hotspots," is to create national wireless coverage for users by patching together a network of local access points from various providers (cable, DSL, etc). So far, their strategy is to convince operators of hotels, coffee shops, restaurants, and bookstores to become hot spot hosts as a value add to their customers. Brand name locations hosting hot spots include Jet Blue® terminals, Starbuck's®, Tully's Coffee®, and even McDonald's®. However, a need exists for apparatus, systems, and methods that extend the possible venues that can provide Wi-Fi service and/or that can facilitate more easy, widespread, and/or ad-hoc access.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
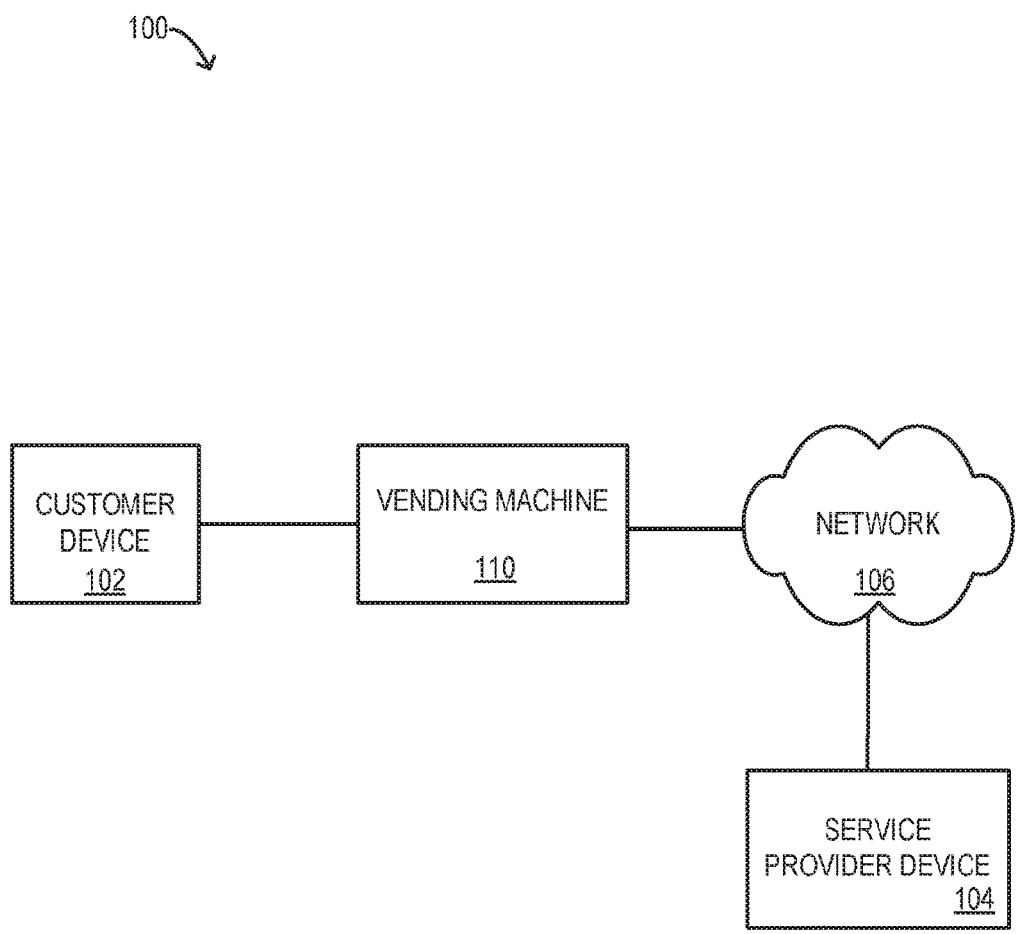
FIG. 1 is a block diagram of a system according to some embodiments.

Applicants have recognized that, in some situations, it may be advantageous to provide a vending machine (and/or other device, such as a kiosk) configured to host wireless local area networks (e.g., via WAPs), thus permitting customers to access the Internet and/or other public communication networks through personal mobile devices (hereinafter "customer devices"). More particularly, Applicants hereby disclose apparatus, systems, and methods for facilitating the sale and distribution of wireless access to a communications network through a vending machine (and/or other device) that may also be configured to dispense one or more physical products, such as snacks and drinks. In accordance with one or more embodiments, a vending machine may permit a customer, through a customer device such as a Personal Computer (PC), PDA, or cellular telephone, to access a communications network (e.g., PSTN, the Internet) after first establishing a preliminary communication link between the customer device and the vending machine.

According to one or more embodiments, a vending machine may be configured to: (i) output a message to a customer, through a vending machine and/or customer device, prompting the customer to utilize a communication network; (ii) receive, from the customer, a request to initiate a communication session, the request comprising one or more of (a) a signal indicating an acceptance of an offer, (b) a signal indicating a product selection, (c) a tendered payment, (d) a payment identifier, (e) a customer identifier, and/or (f) a customer device identifier; (iii) establish a first communication link with a customer device; and/or (iv) establish a second communication link with at least one remote device (e.g., a server computer), thereby permitting the customer device to send data to and/or receive data from the at least one remote device (e.g., permitting Wi-Fi access to the Internet).

In some embodiments, additional and/or alternative steps may include: (i) outputting an access code to a customer (e.g., via receipt printer; on sticker attached to a product; via email sent to a customer device); (ii) receiving an access code from a customer (e.g., via customer device); (iii) verifying/validating an access code (e.g., by confirming that access code received matches one previously issued); (iv) upon verifying/validating an access code, establishing the second communication link; (v) determining a price to charge a customer based on one or more of: (a) a customer's status (e.g., a customer's status as a prepaid unit account holder, such as is described in Applicants' co-pending U.S. Pat. App. Serial No. US2004/041561, the customer account descriptions and concepts of which are hereby incorporated by reference herein), (b) an amount of usage (e.g., ten (10) minutes of Wi-Fi access), (c) a product selected by the customer (e.g., Wi-Fi access is less expensive if a customer selects a higher margin snack product; Internet access is free if a customer selects a Coke® product); and/or (vi) dispensing a physical product (such as a snack, drink, music CD, DVD).

In some embodiments, the vending machine may hold a "master" Wi-Fi account, and customers may purchase minutes of access time utilizing this account. Customers may tender payment to the vending machine, obtain an access code from the vending machine, and/or use that access code to gain access to the Wi-Fi network for a period of time through the vending machine.

According to some embodiments, purchase of time may be made directly through the customer's wireless device itself (without requiring the customer to interact with the vending machine's interface). Simply by being within a certain physical proximity of the vending machine, for example, may allow the customer to sign-up for or access an existing account for minutes credited through the machine (e.g., utilizing Bluetooth® technology).

Vending machines (and/or other devices) configured in accordance with the embodiments described herein may generally benefit consumers in that such machines may provide increased access to communications networks (e.g., Wi-Fi access to the Internet). Vending machines configured to host "hotspots" in accordance with some embodiments may provide, for example, hot spot service providers (e.g., Boingo®, Cometa™) with an opportunity to increase service, increase market penetration, and/or lower costs (and ultimately prices).

Vending machines configured in accordance with some embodiments may benefit operators of vending machines as they provide more opportunities to serve customers through the ability to provide access to communications networks. Additionally, vending machines that provide access to communications networks may attract customers who otherwise may not have purchased traditionally vended physical goods (a snack or a drink). That is, the added functionality provided through network access may attract customers to the machine, making it more likely that they will purchase physical goods. Further still, vending machines configured in accordance with some embodiments may benefit operators of vending machines through the ability to offer new promotions, including package promotions, where access to communications networks are sold along with physical goods for a single price which is less than the sum of the individual retail prices of each component product. Moreover, vending machines according to some embodiments may attract new types of customers (e.g., customers who may generally wish to purchase wireless network access but not traditionally vended physical products such as food items).

II. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims.

Some embodiments described herein are associated with a "control system". As used herein, the term "control system" may generally refer to any combination of hardware, software, firmware, and/or microcode that is operative to carry out and/or facilitate embodiments described herein. For example, a control system may comprise a processor performing instructions of a program to provide Wi-Fi access to customers. The control system may comprise, according to some embodiments, a single device and/or component or may comprise any practicable number of networked devices.

Some embodiments described herein are associated with a "network device". As used herein, the term "network device" may generally refer to any device that can communicate via a network. Examples of network devices include a PC, a workstation, a server, a printer, a scanner, a facsimile machine, a copier, a PDA, a storage device (e.g., a disk drive), a hub, a router, a switch, and a modem or a wireless phone. In some embodiments, network devices may comprise one or more network components, such as a Static Random Access Memory (SRAM) device or module, a network processor, and/or a network communication path, connection, port, or cable. Some examples of network devices may include, but are not limited to, servers or controllers, customer devises, vending machines, input devices, output devices, and peripheral devices.

As used herein, the terms "server" and "controller" may be used interchangeably and may generally refer to any device that may communicate with one or more vending machines, one or more third-party servers, one or more remote controllers, one or more customer devices, one or more peripheral devices and/or other network nodes, and may be capable of relaying communications to and/or from each such device. A controller or sever may, for example, comprise one or more network devices and/or components.

As used herein, the terms "customer device" and "user device" may be used interchangeably and may generally refer to any device owned and/or operated by, or otherwise associated with a customer, which device is capable of accessing and/or outputting online and/or offline content. Customer devices may communicate with one or more servers or controllers, one or more vending machines, one or more third-party service provider servers, one or more user terminals, and/or other network devices or nodes. In some embodiments, customer devices may, for example, include gaming devices, PC devices, PDA devices, Point-Of-Sale (POS) terminals, point of display terminals, kiosks, telephones, cellular phones, Automated Teller Machines (ATM) devices, pagers, and/or combinations of such devices. In some embodiments, customer devices may communicate with vending machines and remote devices and/or computers wirelessly, through any practicable wireless communication networks, formats and/or protocols, including but not limited to those described herein.

As used herein, the term "vending machine" may generally refer to any system, apparatus, and/or module that is operable to provide and/or facilitate the provision of goods and/or services to customers. Vending machines may include, but are not limited to, for example, one or more stand-alone, networked, automated, mechanical, and/or electrical devices coupled to dispense products such as beverages and/or snacks to customers. In some embodiments, vending machines may comprise, be coupled to, and/or may be otherwise associated with one or more input devices, output devices, and/or peripheral devices (e.g., to operate in accordance with embodiments described herein).

As used herein, the terms "product," "good," "item", "merchandise," and "service" may be used interchangeably and may generally refer to anything licensed, leased, sold, available for sale, available for lease, available for licensing, and/or offered or presented for sale, lease, or licensing including individual products, packages of products (such as mystery packages), subscriptions to products, contracts, information, services, and intangibles. Examples of goods sold at vending machines may include, but are not limited to: beverages (e.g., cans or bottles of soda or water), snacks (e.g., candy bars), and recordable media (e.g., pre-recorded and/or dynamically-recorded disks or tapes). Examples of services sold by vending machines include car washes, photography services and access to digital content (e.g., permitting the downloading of digital picture, video, and/or audio files such as audio "ring tunes" and/or wallpapers to a handheld device). In some embodiments, Wi-Fi and/or other network access may comprise a product and/or service offered by a vending machine (e.g., in accordance with embodiments described herein).

As used herein, the term "input device" may generally refer to a device that is used to receive input. An input device may communicate with and/or be part of another device (e.g. a point of sale terminal, a point of display terminal, a customer terminal, a server, a customer device, a vending machine, a controller, and/or a peripheral device). Some examples of input devices include, but are not limited to: a bar-code scanner, a magnetic stripe reader, a computer keyboard, a point-of-sale terminal keypad, a touch-screen, a microphone, an infrared sensor, a sonic ranger, a computer port, a video camera, a motion detector, a digital camera, a network card, a Universal Serial Bus (USB) port, a Global Positioning System (GPS) receiver, a Radio Frequency IDentification (RFID) receiver, a RF receiver, a thermometer, a pressure sensor, and a weight scale or mass balance.

As used herein, the term "output device" may generally refer to a device that is used to output information. An output device may communicate with and/or be part of another device (e.g. a vending machine, a point of sale terminal, a point of display terminal, a customer device, and/or a controller). Possible output devices may include, but are not limited to: a Cathode Ray Tube (CRT) monitor, a Liquid Crystal Display (LCD) screen, a Light Emitting Diode (LED) screen, a printer, an audio speaker, an Infra-red Radiation (IR) transmitter, an RF transmitter, and/or a product hopper, dispenser, and/or data port.

As used herein, the term "peripheral device" may refer to any device associated with one or more vending machines, the peripheral device being operable to perform in accordance with embodiments as described herein. For example, in one embodiment a traditional vending machine may be retrofitted with a peripheral device that comprises a processor, memory, and/or an output device for facilitating promotions such as mystery package promotions in accordance with embodiments described herein. A peripheral device may or may not be attached or coupled to a vending machine. A peripheral device may or may not be operable to direct the associated vending machine to perform certain functions. A peripheral device, or portions thereof, may be housed inside the casing of the associated vending machine.

Further, a peripheral device may be operable to detect one or more events at a vending machine. For example, a peripheral device may be operable to detect one or more signals output by a processor of a vending machine. Further still, a peripheral device may be operable to communicate with a processor of an associated vending machine. According to some embodiments, a peripheral device (and/or a vending machine itself) may be configured to conserve coins and/or to facilitate intelligent dispensing of products.

Some embodiments described herein are associated with an "operator". As used herein, the term "operator" may generally refer to the owner of a vending machine or an agent or associate thereof (e.g., a route driver or lessee of a vending machine). In some embodiments, an operator may also be associated with a server or controller and/or customer devices utilized to implement embodiments described herein. Operators may also or alternatively be associated with the manufacture and/or distribution of one or more products or services provided via a vending machine. According to some embodiments, an operator may be associated with restocking one or more vending machines (e.g., on a restock date and/or at a restock time).

As used herein, the term "promotion" may generally refer to a message that is output, regarding some product, distinct from a general offer to sell products from a vending machine at retail prices. For example, a promotion may comprise a message intended to increase machine profitability. Typically, a promotion allows customers to purchase one or more products under terms that are generally more favorable to the customer than standard retail terms (e.g., at prices less than or equal to the corresponding product's full price(s), but greater than or equal to the corresponding product's minimum price(s)). In some embodiments, a promotion may comprise an offer and/or incentive associated with providing Wi-Fi access to customers via the vending machine and/or another device.

As used herein, the terms "package deal", "combination deal", "package promotion", "combination promotion", "combination product promotion", "load-up deal", "value combo deal", and "combo deal" may be used interchangeably and may generally refer to any offer enabling a customer to purchase at least two products. In many embodiments the at least two products are sold for a single price. In many embodiments, the two products are dispensed to the customer essentially simultaneously (e.g., within seconds of each other). Typically, package offers are configured so the price of the at least two products is less than the sum of the prices of the two products, and thus the customer saves money compared to the sum of the individual component products' retail prices. According to some embodiments, customers may be presented with package offers that include and/or are associated with Wi-Fi access.

As used herein, the term "package price" may generally refer to the price that is charged (typically in a single transaction) for the units of products purchased pursuant to a package offer (e.g., associated with one or more package instances). Typically, package prices reflect a net-savings to the customer when compared to the sum of the respective retail prices of the individual component products.

As used herein, the term "access code" may generally refer to an alphanumeric code provided to a customer that may be used (e.g., by a vending machine) to confirm the customer's entitlement to access a communications network through one or more of a customer device and a vending machine and/or other access device. In one embodiment, an access code may comprise one or more of a user name, a password, a Personal Identification Number (PIN), a device's serial number, a software license number, a biometric identifier, or the like.

Some embodiments herein are associated with "communication". As used herein, the term "communication" may refer to any information, data, and/or signal that is provided, transmitted, received, and/or otherwise processed by an entity, and/or that is shared or exchanged between two or more people, devices, and/or other entities.

As used herein, the terms "information" and "data" may be used interchangeably and may refer to any data, text, voice, video, image, message, bit, packet, pulse, tone, waveform, and/or other type or configuration of signal and/or information. Information may be or include information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encrypted, and/or otherwise packaged or manipulated in accordance with any method that is or becomes known or practicable.

Some embodiments described herein are associated with a "communication session". As used herein, the phrase "communication session" may refer to any instance and/or occurrence of a receipt, transmittal, exchange, and/or sharing of information associated with the communication between two or more parties and/or entities. A communication session may include, for example, an e-mail transmittal, receipt, and/or exchange, an Instant Messaging (IM) session, a voice call (e.g., over a Public Switched Telephone Network (PSTN), a cellular network, or VoIP), a file upload, download, and/or exchange, a receipt and/or transmittal of broadcast media, and/or any combination thereof. Communication sessions may include continuous, periodic, intermittent, and/or any other frequency of communication that is or becomes known or practicable.

Some embodiments described herein are associated with a "communication link". As used herein, the phrase "communication link" may refer to any connection, wire, port, device, and/or signal and/or any transmission, exchange, repeating, and/or other flow of information or data that is associated with the establishing, maintaining, facilitation, and/or other management and/or participation in a communication session. In some embodiments, a communication link may involve a "handshake", multiplexing and/or de-multiplexing of signals, encryption and/or decryption of data, data validation, data conversion, and/or implementation of one or more compression, transmission, and/or communication protocols.

III. Systems and Apparatus

A. Introduction

Generally, a vending machine for use with the some embodiments may comprise a device that is capable of (i) establishing a first communication link with a customer device, (ii) establishing a second communication link with at least one remote network device, (iii) providing and/or facilitating communication between the customer device and the at least one remote network device, (v) processing a payment, and/or (vi) dispensing a product.

Referring first to FIG. 1, a block diagram of a system 100 according to some embodiments is shown. The system 100 may comprise, for example, a customer device 102 in communication with a service provider device 104 via a network 106. This communication may generally be established by and/or facilitated via a vending machine 110 (although it should be understood that in some embodiments, other and/or additional devices may be utilized to establish and/or facilitate the communication, such as a kiosk, Automatic Teller Machine (ATM), etc.). According to some embodiments, the customer device 102 may gain access to the network 106 and/or the service provider device 104 by interfacing with the vending machine 110. A customer of the vending machine 110 that owns and/or operates the customer device 102 may, for example, purchase and/or otherwise acquire (e.g., via a promotion) an access code from the vending machine 110. In some embodiments, access may be associated with the purchase of a product from the vending machine 110. Communication services may be provided as part of a package deal comprising a physical product (e.g., a snack or drink) and an amount and/or duration of access to the network 106. Access may also or alternatively be provided as a gift, prize, and/or promotion that may be associated with and/or based on the customer's purchase of one or more products from the vending machine 110.

In some embodiments, the customer device 102 may comprise a PC, laptop, PDA, and/or wireless or cellular telephone. The customer device 102 may, for example, comprise a Bluetooth®-enabled cellular telephone. In such embodiments, the vending machine 110 may detect and/or actively solicit the customer device 102 with the offer to access the network 106 (e.g., instead of and/or in addition to displaying messages via the vending machine 110). The network 106 may generally comprise any practicable and/or desirable type and/or configuration of network, such as the Internet. The service provider device 104 may generally comprise any type of network device such as a server, router, and/or switch that is operable to provide services to the customer device 102 and/or the vending machine 110. The service provider device 104 may, for example, be owned and/or operated by and/or otherwise associated with an Internet Service Provider (ISP) and/or a Voice over Internet Protocol (VoIP) provider. In the case that the customer device 102 comprises a cellular telephone, for example, the service provider device 104 may comprise one or more devices and/or systems operable to allow the customer (e.g., via the customer device 102) to place a VoIP call. The customer may interface with the vending machine 110 specifically to purchase and/or conduct a VoIP call, for example (such as where cellular coverage is limited and/or unavailable, or where the VoIP call may be a more economical calling option).

Figure 2:
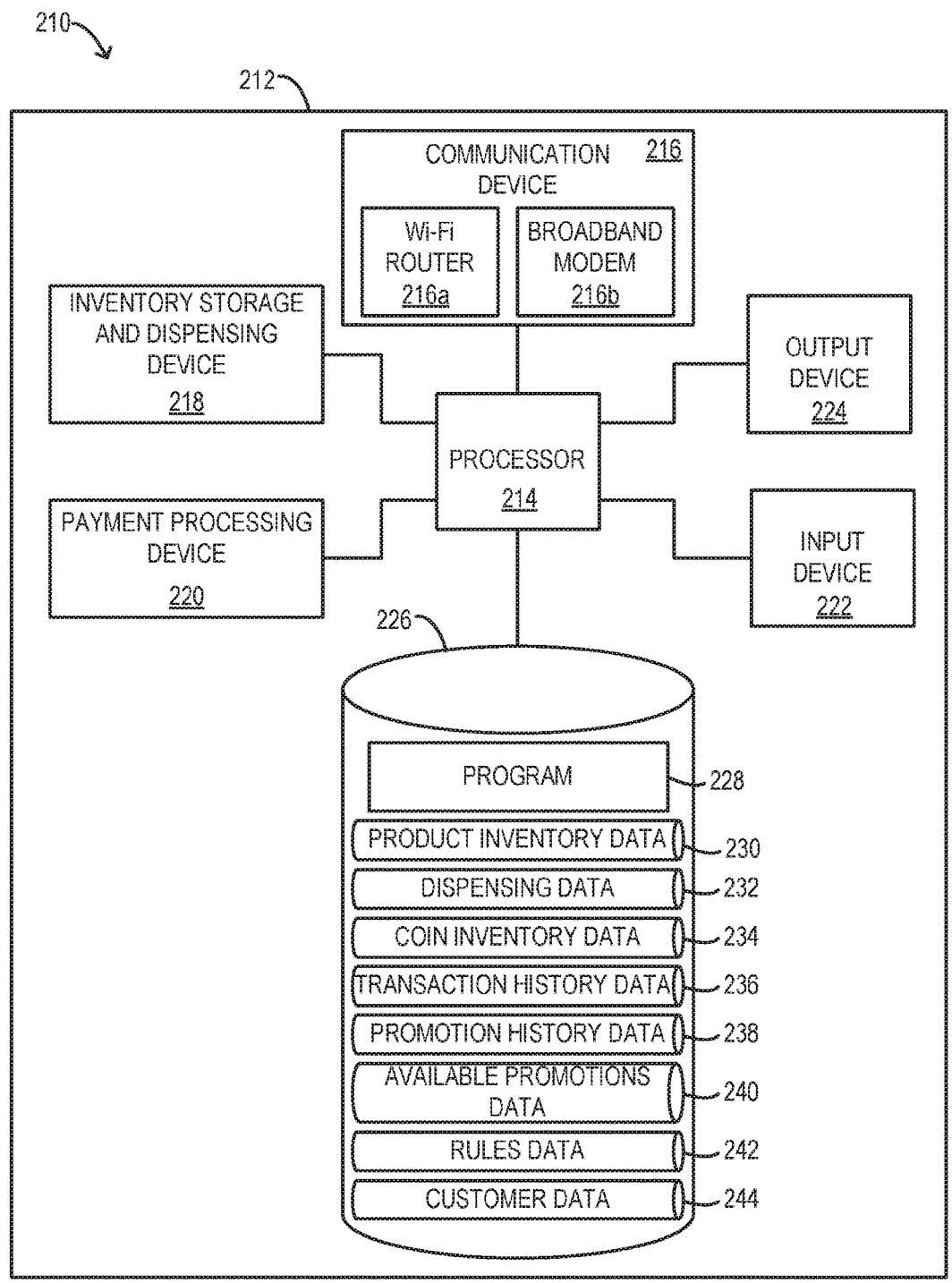
FIG. 2 is a block diagram of a vending machine according to some embodiments.

Turning now to FIG. 2, a block diagram of a vending machine 210 according to some embodiments is shown. In some embodiments, the vending machine 210 may be similar in configuration and/or functionality to the vending machine 110 of FIG. 1. The vending machine 210 may comprise, for example, a casing 212 enclosing one or more of a processor 214, a communications device 216, an inventory and dispensing device 218, a payment processing device 220, an input device 222, an output device 224, and/or a data storage device 226. According to some embodiments, the vending machine 210 may be configured to perform and/or facilitate processes in accordance with embodiments described herein. The vending machine 210 may, for example, be utilized to offer and/or provide Wi-Fi and/or other network access (such as to the network 106 and/or service provider device 104, of FIG. 1).

B. Casing/Cabinetry

In some embodiments, a suitable casing 212 and/or cabinetry may be constructed from any suitable material, including but not limited to any combination of (1) commercial grade sixteen-gauge steel (e.g., for exterior panels and internal shelving), (2) transparent materials such as glass or Plexiglas (e.g., for product display windows), (3) rubber (e.g., for waterproofing insulation), (4) plastic, and/or (5) aluminum.

Many commercially available casings 212 may be adapted to work in accordance with various embodiments. For example, in snack machine embodiments, a suitable casing 212 may comprise the "129 SnackShop" manufactured by Automatic Products International, Ltd. of Saint Paul, Minn., which stands at seventy-two inches (72"/1829 mm) wide, has a width of thirty-eight and seven eighths inches (38⅞"/988 mm), and a depth of thirty-five inches (35"/889 mm). Other suitable snack machine casings 112 include the A La Carte® machine from Automatic Products, and the GPL SnackVendor model #159 from Crane Merchandising Systems/Crane Co. of Stamford, Conn.

In beverage machine embodiments, casings 212 commercially available from Dixie Narco, Inc. of Williston, S.C. may be employed. Beverage machine casings 212 may comprise a "cooler" or "glass front" style front panel, featuring a transparent front panel (e.g., glass) enabling customers to see inventory for sale. Alternatively, beverage machine casings 212 may comprise a "bubble front" style front panel, featuring a decorative front panel, typically used to advertise a logo of a product manufacturer commercially interested in the operation of the vending machine 210.

Other embodiments are contemplated as well, including combination snack and beverage vending machine embodiments, such as those available from Crain Co. Further details concerning the suitability of machine casings 212 and/or cabinetry are well known in the art, and need not be described in further detail herein.

C. Processor/Controller

According to some embodiments, the vending machine 210 may include the processor 214 that may be or include any type, quantity, and/or configuration of processor that is or becomes known. The processor 214 may comprise, for example, an Intel® IXP 2800 network processor or an Intel® XEON™ Processor coupled with an Intel® E7501 chipset. In some embodiments, the processor 214 may comprise multiple inter-connected processors, microprocessors, and/or micro-engines. According to some embodiments, the processor 214 may include or be coupled to one or more clocks or timers (not explicitly shown) and to the communication device 216 through which the processor 214 may communicate, in accordance with some embodiments, with other devices such as one or more peripheral devices, one or more servers, and/or one or more user devices (such as the customer device 102 of FIG. 1). The communication device 216 may, for example, comprise any type or configuration of communication port, cable, modem, and/or signal transceiver that is or becomes known or practicable.

According to some embodiments, the communication device 216 may comprise one or more of a Wi-Fi router 216a and a broadband modem 216b. The Wi-Fi router 216a may, for example, be utilized to communicate with customers and/or devices associated with customers to (i) detect the customer and/or associated devices, (ii) present an offer for network access to the customer (e.g., via the customer's associated device), (iii) receive network access signals (e.g., an activation code) and/or data fro the customer's device (e.g., facilitate network communications), (iv) receive product selection and/or payment signals from the customer's device, and/or (v) provide network information to the customer's device. The broadband modem 216b may generally be operable to allow communications via one or more networks and/or with one or more service providers. The broadband modem 216b may comprise, for example, a DSL, cable, and/or satellite modem operable to provide communications (e.g., to customers) with the Internet. According to some embodiments, the Wi-Fi router 216a may comprise a different device operable to communicate with customers. Instead of the Wi-Fi router 216a, for example, the vending machine 210 and/or the communication device 216 may comprise one or more communication ports (such that a customer may directly connect, e.g., via a cable or wire, to the vending machine 210). Similarly, the broadband modem 216b may alternatively comprise a wireless and/or dial-up connectivity device operable to provide access to one or more networks.

In some embodiments, the processor 214 may also or alternatively be in communication with and/or coupled to any number of other components of the vending machine 210 such as the inventory and dispensing mechanism 218, the payment processing mechanism 220, the input device 222, the output device 224, and/or the data storage device 226.

D. Inventory Storage and Dispensing Device

In some embodiments, the vending machine 210 may comprise the inventory storage and dispensing device 218. The inventory storage and dispensing device 218 may, according to some embodiments, comprise any number and/or configuration of devices and/or components that facilitate and/or are associated with the storage and/or dispensing of products or services available via the vending machine 210. Product inventory storage and product dispensing functions of the vending machine 210 configured in accordance with a snack machine embodiment may include, for example, one or more of: (i) a drive motor, (ii) metal shelves, (iii) a product delivery system (e.g., a chute, product tray, and/or product tray door), (iv) dual spiral (e.g., double helix) item dispensing rods, (v) convertible (e.g., extendable) shelves, and/or (vi) a refrigeration unit. In embodiments using the casing 212 of the "model 129 SnackShop" manufactured by Automatic Products, three (3) removable shelves may be employed, together providing for thirty (30) product rows and an inventory capacity of between one hundred and eighty-five (185) to five hundred and twenty-two (522) commonly vended snack products.

Inventory storage and distribution functions of the vending machine 210 configured in accordance with a beverage machine embodiment may include one or more conventional components, including: (i) metal and/or plastic shelving, (ii) product dispensing actuators/motors, (iii) product delivery chutes, and/or (iv) a refrigeration unit.

In many types of beverage and snack vending machines, operators will typically stock several units of the same product linearly arranged in a column, allowing individual units to be dispensed upon command. The same product may be stocked in more than one column. Similarly, more than one product may be stocked in a single column. In the case that one or more services are available via the vending machine 210, the inventory storage and dispensing device 218 may comprise any device or component that is associated with the storage, transmission, encoding or decoding (e.g., including encryption and decryption), and/or other processing, routing, or electronic delivery or redemption of such services.

Further details concerning vending machine inventory storage and dispensing devices 218 are well known in the art, and need not be described in further detail herein.

E. Payment Processing Device

According to some embodiments, the vending machine 210 may comprise the payment processing device 220. The payment processing device 220 may, according to some embodiments, comprise any number and/or configuration of devices and/or components for receiving payment and/or dispensing change, including a coin acceptor, a bill validator, a card reader (e.g., a magnetic stripe reader), and/or a change dispenser.

In some embodiments, a magnetic stripe card reader may read data on a magnetic stripe of a credit or debit card, for example, and it may cooperate with conventional POS credit card processing equipment to validate card-based purchases through a conventional transaction authorization network. Suitable card-based transaction processing systems and methods are available from USA Technologies, Inc.™ of Wayne, Pa. In some embodiments, a coin acceptor, bill validator and/or change dispenser may communicate with and/or be coupled to a currency storage apparatus (a "hopper"; not shown) and may comprise conventional devices such as models AE-2400, MC5000, TRC200 by Mars, Inc.™ of West Chester, Pa., or CoinCo™ model 9300-L.

Coin acceptors and/or bill validators may receive and validate currency that is stored by the currency storage apparatus. Further, a bill validator or coin acceptor may be capable of monitoring stored currency and maintaining a running total of the stored currency, as is discussed with reference to U.S. Pat. No. 4,587,984, entitled "Coin Tube Monitor Means", the payment and coin-related aspects of which are incorporated by reference herein. According to some embodiments, a change dispenser activates the return of coinage to the customer where appropriate (e.g., where a customer rejects or otherwise fails to accept a dynamically priced upsell offer). Such apparatus may feature Multidrop Bus (MDB) and/or Micromech peripheral capabilities, as are known in the art.

In another embodiment, the vending machine 210 may be configured to receive payment authorization and/or product selection commands or signals through a wireless device communication network (e.g., via the communication device 216), directly or indirectly, from a customer device (e.g., a cellular telephone; not shown). In such an embodiment, the payment processing device 220 may comprise a cellular transceiver operatively connected to the processor 214 to receive, transmit, and/or process such signals. Systems and methods allowing for the selection of and payment for vending machine products via cellular telephones are provided by USA Technologies, Inc.™. Further, in such an embodiment, a customer cellular telephone may serve as an input device 222 and/or an output device 224, as described elsewhere herein.

Further details concerning vending machine payment processing devices 220 are well known in the art, and need not be described in further detail herein.

F. Input and Output Devices

According to some embodiments, the vending machine 210 may comprise the input device 222 and/or the output device 224. In some embodiments, the input device 222 may be operable to receive input from (i) a customer indicating a product and/or offer selection (e.g., Wi-Fi access selection) and/or from (ii) an operator (or agent thereof) during stocking or maintenance of the vending machine 210. Also, the output device may be configured for outputting product and/or offer information (such as Wi-Fi access information and/or promotions) to a customer or operator.

Many combinations of input devices 222 and output devices 224 may be employed according to various embodiments. In some embodiments, the vending machine 210 may include more than one input device 222. For example, the vending machine 210 may include an exterior input device 222 for receiving customer input and an interior input device 222 (neither shown separately) for receiving operator input. In some embodiments, the input device 222 may provide the dual functionality of receiving input data from both operators and customers. Likewise, a vending machine may comprise more than one output device 224 (e.g., an LCD screen and several LED devices, as described herein). In some embodiments, such as those which feature touch screens (described elsewhere herein), the functionality of both input devices 222 and output devices 224 may be provided by a single device.

Many input devices 222 are contemplated. Thus, an input device 222 may comprise one or more of the following: (i) a set of alpha-numeric keys for providing input to the vending machine, such as the Programmable Master Menu® Keypad, (ii) a selector dial, (iii) a set of buttons associated with a respective set of item dispensers, (iv) a motion sensor, (v) a barcode reader (e.g., a 1-D or 2-D barcode reader), (vi) a voice recognition module, (vii) a Dual-Tone Multi-Frequency receiver/decoder, (viii) a wireless device (e.g., a cellular receiver; a radio-frequency receiver; an infrared receiver; a wireless access point or wireless router; other wireless devices), (ix) a smart card reader, (x) a magnetic stripe reader, (xi) a biometric identification apparatus (e.g., an iris scanner, a retinal scanner, a thumbprint reader, etc.), (xii) a customer device, and/or (xiii) any other type or configuration of input device 222 that may be or become known or practicable.

In some embodiments, an input device 222 may comprise an optical reader (e.g., a 2-D bar code scanner) capable of scanning a barcode, such as a bar code which is displayed on a screen or monitor of a user's cellular phone, PDA, Blackberry® business phone, Blackberry® handheld or other handheld device. One system employing such technology, the Cmode® service, has been developed by a partnership between Coca-Cola® Co. and NTT DoCoMo™ Inc. of Japan.

Likewise, many types of output devices 224 are contemplated. For example, an output device may comprise an LCD screen or device. Alternatively or additionally, the output device 224 may comprise one or more LED displays or devices (e.g., several alphanumeric multi-color or single color LED displays on the shelves of a vending machine associated proximately with each row of product inventory).

In one embodiment, an LED display screen is mounted atop the vending machine (via bolts or other mounting hardware) and is used to communicate offers and other messages (e.g., product advertisements, such as Wi-Fi access offers) to prospective customers. A suitable LED display screen for such an embodiment may be housed in an aluminum case having a length of approximately twenty-seven and one half inches (27.5"/698.5 mm), a height of approximately four and one quarter inches (4.25"/107.95 mm), and a depth of approximately one and three quarter inches (1.75"/44.5 mm). Such a display screen may have a display area capable of showing about thirteen (13) alphanumeric and/or graphical characters. Further, such an LED display screen may comprise a serial computer interface, such as an RJ45/RS232 connector, for communicating with the processor 214. Further still, such an LED display may be capable of outputting text and graphics in several colors (e.g., red, yellow, green, black) regarding current and upcoming promotions.

Further, in some embodiments, the output device 224 may comprise a printer. In one embodiment, a printer may be configured to print on card stock paper of approximately one hundredth of an inch or less (e.g., 0.01"/0.15 mm or less) in thickness, such as the EPSON EU-T400 Series Kiosk Printer. Further, a printer may be capable of thermal line printing of various alphanumeric and graphical symbols in various font sizes (e.g., ranging from nine (9) to twenty-four (24) point) on various types of paper. Additionally, such a printer may communicate with the processor 114 via an RS232/IEEE 12834 and/or bi-directional parallel connection. Such a printer may further comprise a data buffer of various practicable sizes, such as approximately four kilobytes (4 KB). In some embodiments, the printer may be operable to output Wi-Fi access codes to customers and/or to print stickers, labels, and/or other indications to be attached to products vended by the vending machine 210. The output device 224 may also comprise a device operable to attach and/or print indications of access codes onto one or more products of the vending machine 210 (e.g., as the products are loaded by an operator, while the products are shelved within the vending machine 210, and/or as the products are dispensed—such as a hopper printing and/or coupling mechanism). According to some embodiments, the output device 224 may also or alternatively comprise an audio module, such as an audio speaker, that outputs information to customers audibly.

As stated, in some embodiments, a touch-sensitive screen may be employed to perform both input device 222 and output device 224 functions. Suitable, commercially available touch screens for use according to various embodiments are manufactured by Elo TouchSystems, Inc., of Fremont, Calif., such as Elo's AccuTouch series touch screens. Such touch screens may comprise: (i) a first (e.g., outer-most) hard-surface screen layer coated with an anti-glare finish, (ii) a second screen layer coated with a transparent-conductive coating, and/or (iii) a third screen layer comprising a glass substrate with a uniform-conductive coating. Further, such touch screens may be configured to detect input within a determined positional accuracy, such as a standard deviation of error less than plus or minus eight hundredths of an inch (±0.08"/2 mm). The sensitivity resolution of such touch screens may be more than one hundred thousand touchpoints per square inch (100,000 touchpoints/in$^2$/15,500 touchpoints/cm$^2$) for a thirteen inch (13") touch screen. For such touch screens, the touch activation force required to trigger an input signal to the processor 214 via the touch screen may typically be around two to four ounces (2-4 ounces/57-113 g). Additionally, touch screens for use according to various embodiments may be resistant to environmental stressors such as water, humidity, chemicals, electrostatic energy, and the like. These and other operational details of touch screens (e.g., drive current, signal current, capacitance, open circuit resistance, and closed circuit resistance) are well known in the art and need not be described further herein.

In some embodiments, input and/or output functionality of the vending machine 210 may be facilitated through a wireless device configured to send data to, and/or receive data from, a customer device (e.g., the customer device 102 of FIG. 1), such as a laptop computer or a cellular telephone. In some embodiments, such a wireless device may comprise a sensor that detects signals from a customer device. Such signals may include but are not limited to radio frequency signals and/or Infrared Radiation (IR) signals. Thus, in one or more embodiments, a wireless input device 222 may comprise a WAP or router configured to operate in accordance with an IEEE 802.11 standard, including the 802.11b and 802.11g standards, which transmit at 2.4 GHz, or the 802.11a standard, which transmits at 5 GHz. Such a wireless input device 222 may, in some embodiments, have the capability to "frequency hop" between radio frequencies so as to reduce interference and/or increase security. Encryption techniques may also or alternatively be employed to increase the security of transmissions. Suitable WAPs are available from Belkin™ Corporation of Compton, Calif. and Cisco™ Systems, Inc. of San Jose, Calif. The wireless input device 222 may, in some embodiments, be used to establish a communication link (such as a first communication link with a customer device) as described herein.

G. Data Storage/Memory

The data storage device 226 may include any appropriate combination of magnetic, optical and/or semiconductor memory, and may include, for example, additional processors, communication ports, RAM, Read-Only Memory (ROM), a compact disc and/or a hard disk. The processor 214 and the storage device 126 may each be, for example: (i) located entirely within a single computer or other computing device; or (ii) connected to each other by a remote communication medium, such as a serial port cable, a Local Area Network (LAN), a telephone line, RF transceiver, a fiber optic connection and/or the like. In some embodiments for example, the vending machine 210 may comprise one or more computers (or processors 214) that are connected to a remote server computer (e.g., via the communication device 216) operative to maintain databases, where the data storage device 226 is comprised of the combination of the remote server computer and the associated databases.

The data storage device 226 may generally store one or more programs 228 for controlling the processor 214. The processor 214 may perform instructions of the program 228, for example, and thereby operate in accordance with some embodiments, and particularly in accordance with the methods described in detail herein. According to some embodiments, the program 228 may comprise any number or type of programs that are or becomes known or practicable. In some embodiments, the program 228 may be developed using an object oriented programming language that allows the modeling of complex systems with modular objects to create abstractions that are representative of real world, physical objects and their interrelationships. However, it would be understood by one of ordinary skill in the art that the embodiments described herein can be implemented in many different ways using a wide range of programming techniques as well as general purpose hardware systems or dedicated controllers.

The program 228 may be stored in a compressed, uncompiled and/or encrypted format. The program 228 furthermore may include program elements that may be generally useful, such as an operating system, a database management system and/or device drivers for allowing the processor 214 to interface with computer peripheral devices and/or the various components of the vending machine 210. Appropriate general purpose program elements are known to those skilled in the art, and need not be described in detail herein.

Further, the program 228 may be operative to execute a number of invention-specific objects, modules and/or subroutines which may include (but are not limited to) one or more subroutines to determine whether a promotion should be output; one or more subroutines to determine a promotion type; one or more subroutines to populate a promotion type (such as a mystery promotion), thereby constructing a promotion instance; one or more subroutines to select a constructed promotion instance from a plurality of hypothetical promotion instances; one or more subroutines to determine an expected value of a promotion being considered for output; one or more subroutines to determine how and/or when products should be dispensed from the vending machine 210; one or more subroutines to determine access codes associated with Wi-Fi access; and/or one or more subroutines to provide and/or facilitate Wi-Fi access. Examples of some of these subroutines and their operation are described in detail with respect to the processes described elsewhere herein.

According to some embodiments, the instructions of the program 228 may be read into a main memory (not explicitly shown) of the processor 214 from another computer-readable medium (such as the data storage device 226), like from a ROM to a RAM. Execution of sequences of the instructions in the program 228 may cause the processor 214 to perform the process steps described herein. In alternative embodiments, hard-wired circuitry or integrated circuits may be used in place of, or in combination with, software instructions for implementation of the processes described herein. Thus, some embodiments are not limited to any specific combination of hardware, firmware, and/or software.

In addition to the program 228, the data storage device 226 may also be operative to store one or more databases, files, and/or tables, containing information such as (i) product inventory data 230, (ii) dispensing data 232, (iii) coin inventory data 234, (iv) transaction history data 236, (v) promotion history data 238, (vi) available promotions data 240, (vii) rules data 242, and/or (viii) customer data 244. Any number of other arrangements may be employed besides those suggested by the tables shown. For example, even though eight separate data tables, stores, files, and/or databases are illustrated, embodiments may be practiced effectively using fewer or more functionally equivalent databases or similar structures. These databases and/or other databases (not shown) may also or alternatively store information associated with Wi-Fi access. Transmission logs, available service providers and/or networks, identified customer devices, network statistics (e.g., usage, bandwidth, performance), and/or other metrics may, for example, be stored to facilitate the providing of Wi-Fi access via the vending machine 210.

Further, despite the depiction of the data as tables, an object-based model could be used to store and manipulate the data types and likewise, object methods or behaviors can be used to implement the processes described herein.

H. Vending Machine Retrofitting

In some embodiments, one or more of the processor 214, the input device 222, the output device 224, and the data storage device 226 may be included, wholly or partially, in a separate device (e.g., separate from and/or external to the casing 212; not shown), such as the e-Port™ by USA Technologies Inc., that may be in communication with the vending machine 210. The separate devices may also or alternatively be in communication with a network such as the Internet (e.g., via the communication device 216).

The e-Port™ is a credit and smart card-accepting unit that controls access to office and MDB vending equipment, and serves as a point of purchase credit card transaction device. The e-Port™ includes an LCD that allows for the display of color graphics, and a touch sensitive input device (touch screen) that allows users to input data to the device. The display may be used to prompt users interactively with, e.g., offers and information about their transaction status.

The separate device may alternatively be a programmed computer running appropriate software for performing various functions described herein. The separate device may be operable to receive input from customers, receive payment from customers, exchange information with a remotely located server (e.g., an ISP server, a VoIP service provider's server) and/or display messages to customers (e.g., Wi-Fi access promotions). The separate device may be operable to instruct the vending machine that appropriate payment has been received (e.g., via a credit card read by the separate device), that a particular product or products should be dispensed by the vending machine, and/or how and/or when those products should be dispensed (e.g., to avoid product collisions and/or other complications). Further, a separate device may be operable to instruct the vending machine to execute Wi-Fi access promotions (package or single product Wi-Fi access promotions), price changes, or the like.

Thus, a separate device may be operatively connected to a vending machine 210 to perform various processes and steps described herein including the establishment of communication links to provide Wi-Fi access, such as the first and second communication links described herein. In this manner, conventional vending machines may be retrofitted with such separate devices so as to perform the processes described herein.

I. Other Separate Devices

It should be noted that, in some embodiments, some or all of the functions and method steps described herein may be performed partially or entirely by one or more separate devices (not explicitly shown), which are not necessarily retrofitted to a vending machine 210. Separate devices for use with such an embodiment include, but are not limited to, kiosks and customer devices (PDA devices, laptop computers, and cellular telephones). In some embodiments featuring separate devices, such devices may be capable of communicating, directly (e.g., via Bluetooth® connectivity) or indirectly (e.g., through a web server or IVRU), to a vending machine control system in order to facilitate the inventive functionality described herein. In some embodiments featuring separate devices, such separate devices are capable of communicating with a remote computer.

J. Network Embodiments

Network environments may include a remotely located device or computer (e.g., a server, mainframe, or other device) that is in communication, via a communications network, with one or more vending machines 210 and/or customer devices. Such a configuration may facilitate a second communication link as described herein.

The remote device or computer may communicate with the vending machines 210 and/or customer devices, and the vending machines 210 may communicate with each other, directly or indirectly, via a wide variety of wired and/or wireless means, mediums, protocols and communications standards. Some, but not all, possible communication links and networks that may comprise the network or be otherwise part of the system include but are not limited to: PSTN links, satellite links, cellular links, optical links, infrared links, radio frequency links, and/or Cable TV links. Various networking configurations, standards and protocols may be employed, including but not limited to: IP addressing via the Internet, a local area network (LAN), a wireless LAN, a wide area network (WAN), Ethernet (or IEEE 802.3), Token Ring, SAP, ATP, Bluetooth, TCP/IP and/or via any appropriate combination thereof. Communication may be encrypted to ensure privacy and prevent fraud in any of a variety of ways well known in the art.

Access to one or more communications networks described herein may be governed by a network service account maintained with a commercial service provider, bulletin board system or the like. Example of service providers include but are not limited to ISPs and VoIP service providers. Accounts and/or corresponding network service may be accessed via dial-up, cable, DSL, T1, T3, cellular or other methods. Thus, in one or more embodiments, a vending machine 210 and/or operator thereof maintains a network service account with a service provider so that customers of a vending machine may access a communications network via a first communication link (between a vending machine and a customer device) and a second communication link (between a vending machine and a remote device or computer, such as a service provider's server; between a customer device and a remote device or computer). All or a portion of the costs of maintaining such a network service account may be passed on to the customer of the vending machine, such as by (1) raising the prices of physical goods vended from the vending machine, or (2) charging a fee (independent of the purchase of physical goods from the vending machine). A vending machine and/or operator associated therewith may charge "upfront" fees (e.g., six dollars ($6) for one (1) hour of Wi-Fi Internet access; twenty dollars ($20) per month for unlimited Wi-Fi Internet access); or fees may be levied ex post facto, based on the customer's usage (e.g., a "Pay-as-you-go" account), where fees are deducted from a previously identified financial account, such as a credit/debit card account. Thus, a vending machine 210 and/or operator associated therewith may establish "sub accounts", which entitle customers to use the network service account that the vending machine 210 and/or operator maintain with a service provider. In other embodiments, a vending machine 210 and/or operator associated therewith may not charge customers for access to its network service account, as Applicants have recognized that the cost of maintaining such a network service account with a service provider and allowing vending machine customers to freely access such an account may be sufficiently offset by a resulting increase in sales volume for traditionally vended physical goods, such as snacks and drinks.

Vending machines 210 may comprise computers, such as those based on the Intel® Pentium® or Centrino™ processor, that are adapted to communicate with the remote device or computer. Any number and type of machines may be in communication with the remote device or computer.

Those skilled in the art will understand that vending machines 210, devices and/or computers in communication with each other need not be continually transmitting to each other. On the contrary, such vending machines, devices and/or computers need only transmit to each other as necessary, and may actually refrain from exchanging data most of the time. For example, a vending machine in communication with another machine via the Internet may not transmit data to the other machine for weeks at a time.

In some embodiments, the remote device or computer may be accessible, directly or indirectly, via a separate device (such as a customer device) by a customer or operator. Accordingly, a customer or operator may use a device to communicate with the remote computer. A separate device may receive from the remote computer messages described herein as being output by the vending machine 210 (e.g., access codes), and/or may transmit to the remote computer input described herein as being provided to the vending machine 210 (e.g., access codes). Thus, various data described herein as received through an input device of a vending machine 210 may be received by the vending machine 210 from a separate device (e.g., through a Bluetooth® connection) or from a remote computer (which may relay data first received from a customer device such as a personal computer). Similarly, various data described herein as received through an input device 222 of a vending machine 210 may be received through a Web browser communicating with a remote server, which in turn communicates with the vending machine 210.

K. External Appearance

Figure 3:
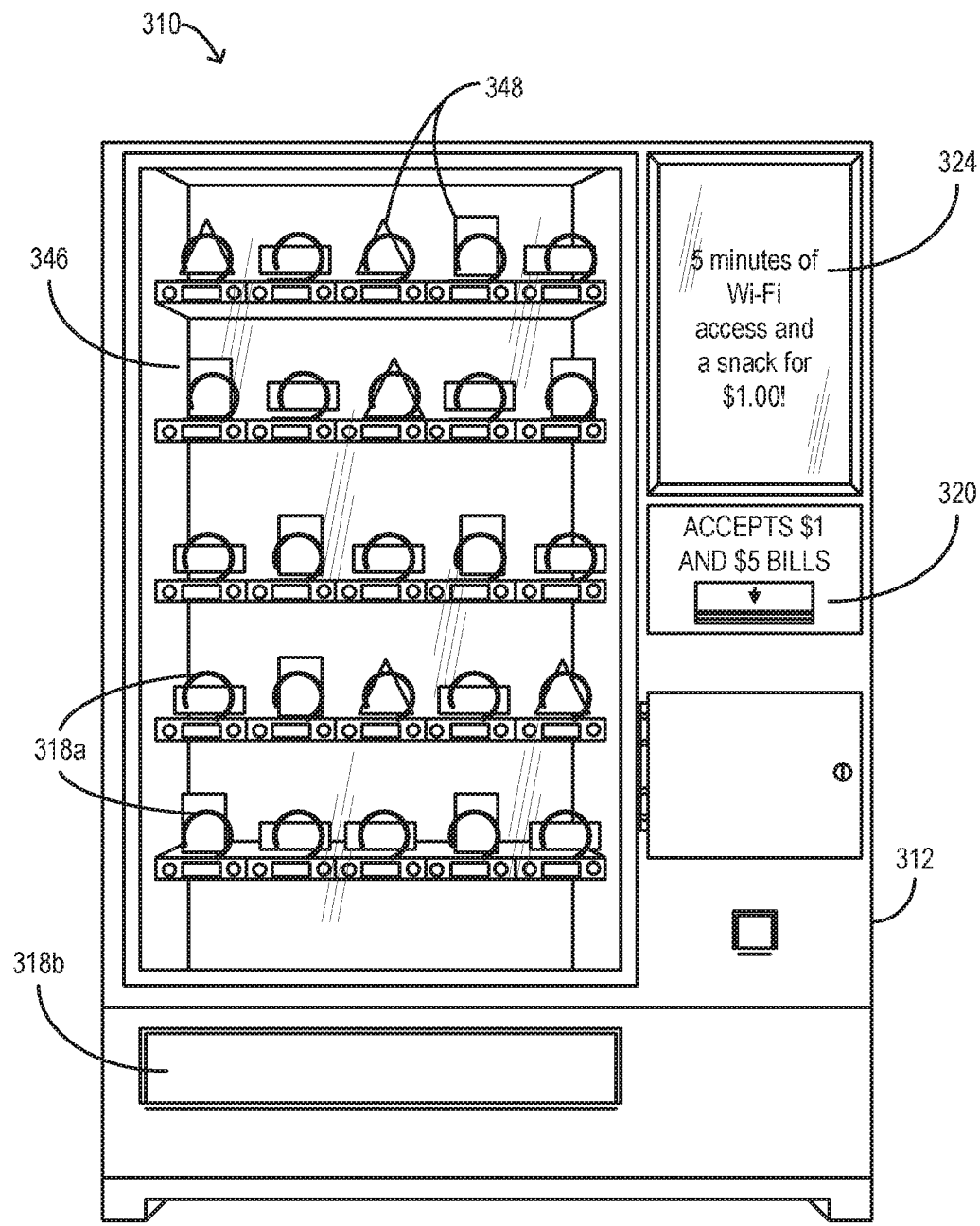
FIG. 3 is a diagram illustrating an example of the external appearance of a vending machine according to some embodiments.

Referring to FIG. 3, a diagram illustrating an example of the external appearance of a vending machine 310 according to some embodiments is shown. In some embodiments, the exemplary vending machine 310 may be similar in configuration and/or functionality to the vending machines 110, 210 described in conjunction with any of FIG. 1 and/or FIG. 2. The exemplary vending machine 310 may comprise, for example, (i) a cabinet 312, (ii) an inventory dispensing mechanism 318a-b (comprising a product storage mechanism 318a and/or a product hopper 318b), (iii) a payment processing mechanism 320, (iii) an output device 324 (e.g., for outputting text and/or graphical information about promotions such as Wi-Fi access promotions to a customer), and (iv) a product display window 346 behind which are visible the products 348 available for sale from the vending machine 310 and the product storage mechanism 318a that holds the products within the vending machine 310. According to some embodiments, the components 312, 318, 320, 324, 346 of the vending machine 310 may be similar in configuration and/or functionality to the similarly named and/or numbered components described in conjunction with FIG. 2 herein.

The casing 312 may, fore example, comprise any type or configuration of cabinetry or enclosure to at least partially house components of the vending machine 310. As described elsewhere herein, for example, the casing 312 may be constructed of steel, aluminum, plastic, rubber, other metals or composite materials, and/or any combinations thereof. In some embodiments, the casing 312 may be configured for the sale of various products or services such as a typical and/or modified version of a typical snack, beverage, dessert, meal, non-edible object, media, and/or any other vending machine 310. According to some embodiments, the inventory dispensing mechanism 318a-b may comprise various component such as the product storage mechanism 318a and/or the product hopper 318b). The product storage mechanism 318a may, for example, comprise a number of latches, levers, paddles, doors, spirals, and/or other product retention, detention, and/or dispensing mechanisms, as are known in the art.

According to some embodiments, a product selected and/or purchased by a customer may be released by the product storage mechanism 318a so that it falls into the product hopper 318b. The product hopper 318b may, according to some embodiments, comprise one or more doors, holes, and/or other means via which a customer may retrieve a dispensed product. The product hopper 318b may also or alternatively comprise one or more components to facilitate prevention of unauthorized product removal (e.g., from someone reaching up into the vending machine 310 via the product hopper 318b) and/or to facilitate the reduction of impact forces experienced by products dropping from the product storage mechanism 318b above.

In some embodiments, the payment processing mechanism 320 may comprise any practicable type of payment receiving, transmitting, and/or processing device that is or becomes known (such as those described elsewhere herein). The payment processing mechanism 320 may, for example, comprise a currency validator and/or input slot, such as shown in FIG. 3. According to some embodiments, the output device 324 may display various information associated with Wi-Fi access promotions and/or product or service sales to a customer. As shown in FIG. 3, for example, the output device 324 may comprise a display screen (and/or touch screen) that advertises the availability of Wi-Fi access via the vending machine 310. The particular offer shown in FIG. 3, for example, allows a customer to pay one dollar ($1) to receive a snack and five (5) minutes of Wi-Fi Internet access. In accordance with some embodiments, the snack and/or other product "packaged" with the network access may comprise a "mystery" product selected by the vending machine 310, such as to manage inventory and/or sales. Various mystery and mystery package embodiments are described in Applicant's co-pending U.S. application Ser. No. 11/282,525, entitled "SYSTEMS AND METHODS FOR VENDING PROMOTIONS" and filed on Nov. 18, 2005, the mystery product and mystery package concepts of which are hereby incorporated by reference herein.

IV. Processes

One benefit of some embodiments is an increase in vending machine profits (e.g., per fill period). Applicants have recognized, for example, that by providing Wi-Fi access via a vending machine, the overall profitability of a vending machine can be increased (e.g., by direct profits from Wi-Fi access charges and/or via increased ancillary sales of other products from the vending machine).

According to some embodiments, a general process designed to increase the profitability of a vending machine within a given fill period and/or provide Wi-Fi access is stored in the memory of a vending machine and is executed by the control system (e.g., the processor, RAM, ROM, and/or software). The control system may be the control system of a vending machine 110, 210, 310, the control system of a peripheral device, the control system of a controller, the control system of a peripheral controller, and/or a control system of a combination of any or all of these devices. Generally, from the control system's perspective, the general process may include the three basic steps of (i) receiving, by a vending machine, a request from a customer to initiate a communication session; (ii) establishing a first communication link between the vending machine and a device associated with the customer; and (iii) establishing a second communication link between the vending machine and a remote network device, such that a communication session is established between the device associated with the customer and the remote network device. The process may further comprise (a) receiving payment from the customer, (b) determining a price to charge the customer for the establishing of the communication session between the device associated with the customer and the remote network device, (c) receiving an indication, from the customer, of a selection of a product sold by the vending machine, and/or (d) dispensing the selected product.

Figure 4:
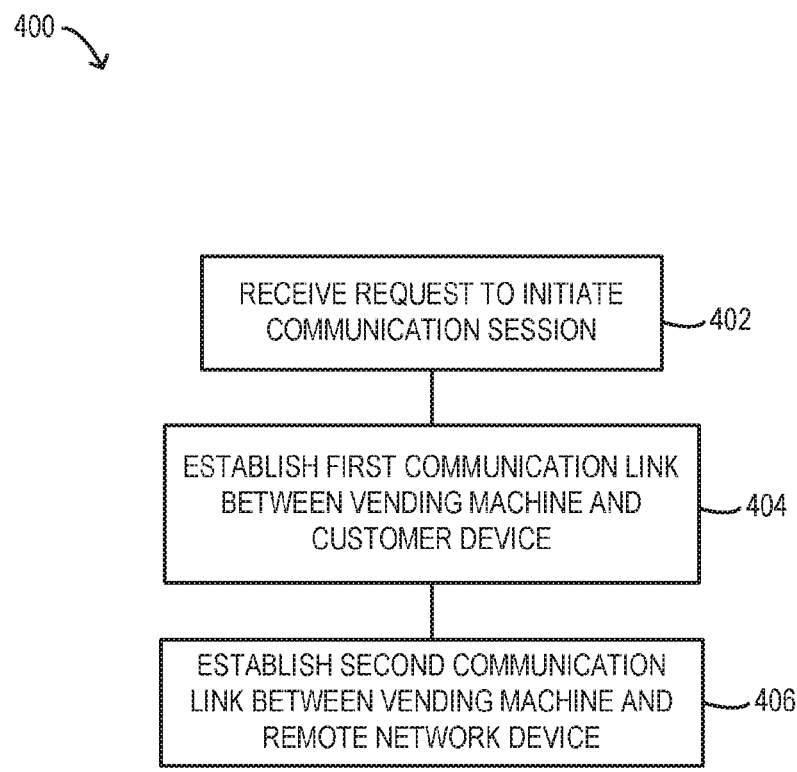
FIG. 4 is a flow diagram of a method according to some embodiments.

Turning to FIG. 4, for example, a flow diagram of a method 400 according to some embodiments is shown. The method 400 may comprise, for example, a method for providing Wi-Fi access to customers. In some embodiments, the method 400 (or portions thereof), and all other processes described herein unless expressly specified otherwise, may be performed, for example, by a vending machine 110, 210, 310, a peripheral device, a controller, a peripheral device controller, a user device, another computing device, and/or any combination thereof. Additionally, while some of the steps of a process may be performed by a first device, other steps may be performed by another device and/or a combination of devices. Further, the method 400, and all other processes described herein unless expressly specified otherwise, may include steps in addition to those expressly depicted in the figures or described in the specification without departing from the spirit and scope of some embodiments. Similarly, the steps of the method 400 and any other process described herein, unless expressly specified otherwise, may be performed in an order other than depicted in the figures or described in the specification, as is practicable and/or appropriate.

In some embodiments, the method 400 may begin at 402, by receiving, by a vending machine, a request from a customer to initiate a communication session. In response to an advertisement and/or offering of the vending machine, for example, the customer may indicate a desire to obtain Wi-Fi access via the vending machine. The customer may provide the indication via any practicable means. The customer may make a selection via a menu and/or button provided by the vending machine, for example, and/or the customer may utilize en electronic device (e.g., the customer device 102 of FIG. 1) to provide the indication. The request may take several forms and/or be indicated through one or more customer-initiated actions, including but not limited to: (i) a signal indicating an acceptance of an offer; (ii) a signal indicating a product selection (e.g., where network access is marketed as a premium/bonus product or as part of a package of products); (iii) a signal indicating that a payment has been tendered and/or validated (e.g., a bill validator has detected and approved a tendered bill; a remote computer has instructed a vending machine that a presented credit card account number has been validated); (iv) a signal indicating a particular payment identifier (e.g., a customer's prepaid unit account number); (v) a signal indicating a customer identifier (e.g., a customer's account number); (vi) a signal indicating a customer device identifier (e.g., a cell phone number as determined through Automatic Number Identification (ANI) technology; a computer's serial number or a software license number).

In some embodiments, the indication may be received via an electronic customer device (and/or directly from the customer) in response to an offer that is actively sent to the customer's device. A Bluetooth®-enabled vending machine may detect the presence of a Bluetooth®-enabled customer device, for example, and send an offer and/or advertisement for Wi-Fi access to the customer via the customer's device.

According to some embodiments, the customer may respond to the offer and/or indicate an acceptance of the offer via the customer's device. In some embodiments, the indication of the request may also provide indications of information associated with the offer, request, and/or requested access. The request may indicate, for example, one or more parameters associated with the access, such as a requested duration, speed, bandwidth, format (e.g., protocol), and/or other characteristic of the Wi-Fi access.

According to some embodiments, the method 400 may continue by establishing a first communication link between the vending machine and a device associated with the customer, at 404. In one embodiment, a vending machine establishes the first communication link by wirelessly communicating with a customer device, through any wireless communications protocol, method, standard or format, as described herein. For example, in one embodiment, a vending machine may wirelessly communicate with a customer's laptop computer through a wireless 802.11b access point (e.g., incorporated into and/or associated with the vending machine), as described herein. In some embodiments, a vending machine may wirelessly communicate with a customer's cellular telephone by using the Bluetooth® wireless protocol, as is known in the art. According to some embodiments, the first communication link may already have been established at 402. In the case that communication of the request and/or a communication of a Wi-Fi access offer are conducted wirelessly between the vending machine and a customer device, for example, the first communication link may be established at 404, via and/or in conjunction with the communications conducted at 402. In one or more embodiments, a vending machine may communicate with a customer device through a wired connection, such as through a serial data cable, USB interface, etc. The customer may be prompted and/or directed to connect a wire and/or cable to a specific port on the vending machine, for example.

In some embodiments, the customer may be further and/or otherwise directed to utilize the communication network. The vending machine, a customer device, and/or a remote device or computer may output a message to a customer, for example, prompting the customer to utilize a communication network, such as the Internet, a PSTN, etc. In one embodiment, the customer is prompted through static (e.g., painted) signage on the vending machine. For example, a painted sign may read: "10 minutes of free Internet access with the purchase of any Coca-Cola® product."

Alternatively, a vending machine, a customer device, and/or remote device or computer may output a message to a customer through an output device such as a touch screen, an LCD screen, or an audio speaker. In one or more embodiments, a vending machine and/or remote device or computer may output a message to a customer device, for output to the customer through an output device of the customer device (e.g., a cellular phone's LCD screen).

In some embodiments, a determination of whether the output of such a prompt is appropriate, necessary, and/or desirable for some business purpose, may be made. For example, a database of stored rules may guide a processor of a vending machine or a remote device or computer to output such a prompt only if certain conditions are satisfied. Such conditions include but are not limited to (i) time of day conditions, (ii) inventory conditions, (iii) sales conditions, (iv) customer identifier or customer status conditions, (v) customer proximity conditions, and/or (vi) other conditions. For example, in an embodiment, a condition may provide that network access should only be marketed through prompts during certain times of day, such as after 6:00 PM, when vending machines sales are typically slow, and/or when network access prices are lower (e.g., if telephonic communication rates are lower at night).

In another embodiment, if current inventory of one or more products in one or more vending machines is greater or less than a certain threshold, a prompt may be output. Such an inventory condition may function to encourage customers to visit a vending machine and potentially purchase physical (e.g., food) products when inventory is in abundant supply. Alternatively or additionally, a condition may provide that network access should be marketed through prompts only when sales conditions indicate that a certain threshold sales volume is lacking or has been exceeded.

In another embodiment, the vending machine may output a message to only a certain class or type of customers, such as customers who have previously established a prepaid user account, as described with reference to Applicants' co-pending U.S. Patent Publication No. US2004/041561 (the user account concepts and descriptions of which are hereby incorporated by reference herein), or customers who have previously registered as members, as described with reference to Applicants' co-pending U.S. Provisional Patent Application Ser. No. US 60/583,653 (the member registration concepts and descriptions of which are hereby incorporated by reference herein). For example, a customer may enter a customer identifier at a vending machine through the vending machine's touch screen, and the vending machine may determine that the customer has previously established an account or membership, and output a prompt for Wi-Fi access and/or service accordingly.

In another embodiment, a vending machine and/or remote device or computer may output a message to a customer device only if it is determined that a customer (or a customer device) is within a certain geographic area of one or more vending machines. For example, a computer may determine, through cellular triangulation and/or other techniques, that a customer and/or the customer's cell phone, is within X miles of a vending machine, and may transmit a text message to the cell phone, prompting the customer with a network access offer.

In some embodiments, the method 400 may continue at 406, by establishing a second communication link between the vending machine and a remote network device, such that a communication session is established between the device associated with the customer and the remote network device. In some embodiments, payment and/or consideration may be received from the customer prior to establishing the second communications link at 406. The customer may be required to provide payment electronically (e.g., via the customer's device), by inserting cash and/or coin into the vending machine, by swiping a credit and/or debit card, and/or be any other practicable means. In some embodiments, as described herein, the payment received from the customer may also be associated with another product and/or service provided by the vending machine. The customer may pay for a package that includes the Wi-Fi access and another product (such as a snack or drink), for example, or may pay only for the other product and may receive the Wi-Fi access as a bonus, gift, and/or prize.

According to some embodiments, a vending machine and/or remote device or computer may establish the second communication link with the remote network device such that the customer device may be able to send data to and/or receive data from the remote network device. While this may generally comprise utilizing the vending machine as a router, switch, hub, and/or intermediate facilitation device between the customer device and the remote network device, it should be appreciated that the vending machine may also or alternatively cause the second communication link to be initiated between the customer device and the remote network device directly (such as be sharing connection information and/or addresses with the devices).

In some embodiments for example, the second communication link comprises an indirect communication link between a customer device and a remote device or computer, where a vending machine communicates with a customer device (e.g., through the first communication link) and also communicates with the remote device or computer, thereby allowing the customer device to communicate indirectly with the remote device or computer (i.e., through the vending machine). For example, in one embodiment, a customer establishes a first communication link between a customer device and a vending machine through the vending machine's WAP. The vending machine, in turn, permits the customer device to access the Internet.

Alternatively, a first communication link need not be continued and/or maintained while a second communication link is continued or maintained. For example, in one embodiment, a customer may transact with a vending machine through a customer device (e.g., through a first communication link) to purchase network access (e.g., by purchasing an access code). Then, the customer (and/or the vending machine) may terminate the first communication link between the vending machine and the customer device, and may establish a second communication link between the customer device and a remote device or computer so that the customer may access a communications network, as agreed. Thus, in one embodiment, a second communication link comprises a direct link between a customer device and a remote computer or device.

It should be noted that the terms "first communication link" and "second communication link" should not imply an order or sequence for establishing such communication links. That is, in one embodiment, a second communication link (between a vending machine and a remote network device or between a customer device and a remote computer) may be established before a first communication link (between a customer device and a vending machine) is established. In another embodiment, a first communication link is established prior to a second communication link.

In one embodiment, while a second communication link is enabled or maintained, data is output to a customer, through a vending machine or a customer device, informing the customer about the customer's usage of the communication network. For example, a customer device may output a message indicating "10 minutes of surf time remaining" or "9 units remaining." Such a message may be output visually (e.g., through an LCD screen) or audibly (e.g., through a speaker). Further, a customer account or database record may be updated on a periodic or substantially continuous basis to reflect usage and/or time elapsed since the establishment of a second communication link.

Figure 5:
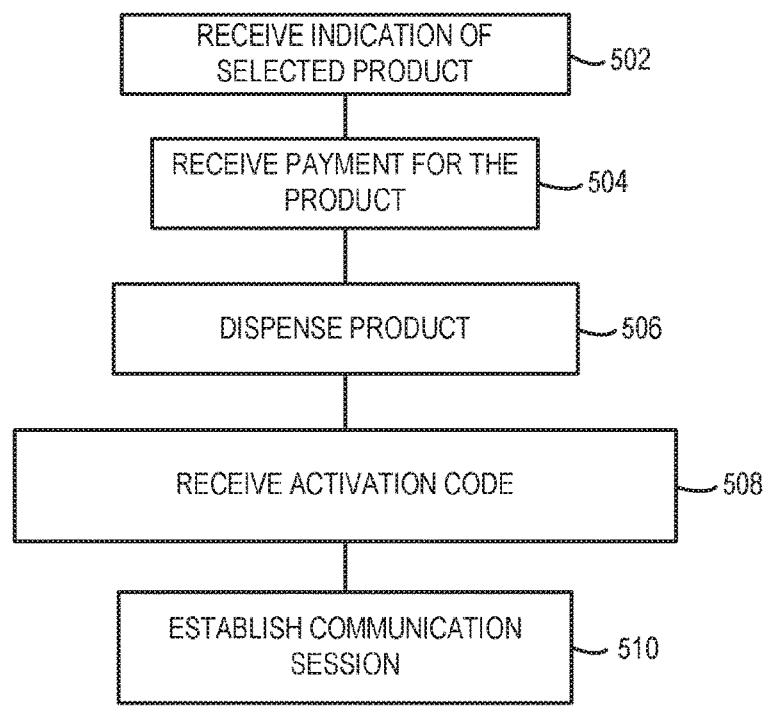
FIG. 5 is a flow diagram of a method according to some embodiments.

Referring now to FIG. 5, a flowchart of a method 500 according to some embodiments is shown. In some embodiments, the method 500 may be related to the method 400 of FIG. 4. The method 500 may, for example, comprise processes that are a continuation and/or are supplemental to those of the method 400 of FIG. 4.

According to some embodiments, the method 500 may begin at 502 by receiving, by a vending machine, an indication of a selection of a product sold by the vending machine. The indication may generally be received in any practicable manner, such as described in conjunction with the receiving of the communication session request indication at 402 of the method 400 of FIG. 4. A customer may, for example, use conventional product selection means and/or techniques to indicate a desire to purchase one or more products from the vending machine. In some embodiments, the customer may indicate a desire to purchase a package of products, as described herein. According to some embodiments, the selection of the product may be associated with Wi-Fi access. The customer may select one or more products, for example, that are packaged with, come with, and/or provide the possibility of winning Wi-Fi access.

In some embodiments, the method 500 may continue by receiving, from a customer, payment for the selected product, at 504. The customer may provide cash, coin, electronic debit, credit card, and/or any other practicable payment and/or payment authorization. According to some embodiments, the customer may select (e.g., at 502) and purchase (e.g., at 504) a vended product in a conventional manner. In some embodiments, the amount and/or type of payment may be determined and/or processed. Payment may be processed by a vending machine and/or by a remote device or computer, for example, using any conventional payment processing apparatus or method, including bill validators and associated methods, credit card processing apparatus and associated methods, and the like, including but not limited to those described herein.

Alternatively or additionally, as vending machines configured in accordance with some embodiments function as Internet nodes, any payment method available on the web (pay-Pal™, electronic wallets, Microsoft™ passport, etc.) may be accepted by a vending machine as a viable payment option. Thus, according to some embodiments, a vending machine may receive a product selection and a payment identifier from a customer, and use the presented payment identifier to obtain authorization, over the Internet, from a remote computer.

At 506, the method 500 may continue by dispensing the product to the customer. In some embodiments, the product may comprise an indication of a communication session activation code. The vending machine may be instructed, for example, to dispense a physical product (e.g., the product indicated as selected at 502), such as a food or beverage item. In one embodiment, where network access is bundled as a component in a package that also includes a physical food item, a customer may be permitted to access a communication network and select a physical food item, which is dispensed from the machine so that the customer may enjoy the food item while accessing the network. For example, a customer may enjoy a Coca-Cola® soda while accessing the Internet to check e-mail, or while accessing a VoIP service to make substantially discounted long distance phone calls. According to some embodiments, the product dispensed may comprise an indication of an activation code that the customer may utilize to obtain Wi-Fi access via the vending machine. An access code may be printed on and/or otherwise indicated by the product and/or product packaging, for example. In some embodiments, only some product in the vending machine may indicate such access codes. Customers may be allowed and/or given an incentive to pick Wi-Fi associated products, for example, or random products stored in the machine may comprise such indications. In the latter example, the customer may receive the access code as a prize, bonus, and/or gift. The indications may generally be hidden from the customer in such embodiments (e.g., to preserve surprise and/or mystery) or may be easily viewable, such that a customer may be likely to purchase more products to cause the dispensing of a product that is associated with Wi-Fi access (e.g., that is located behind other products with the vending machine).

It should be noted that the access code may be otherwise provided to the customer. In the case that the customer purchases and/or is provided with Wi-Fi access, for example, the vending machine may display the access code to the customer, print an indication of the code for the customer, and/or send the code to the customer (e.g., via the customer's device and/or via the first communication link).

In some embodiments, the access code may be determined by the vending machine and/or a peripheral device. In one or more embodiments for example, a vending machine, customer device and/or remote device or computer may determine an access code. In such embodiments, an access code may be subsequently required by the system in order to provide Wi-Fi access (e.g., in order to establish the second communications link, as described herein). In one or more embodiments, access codes may be substantially unique alphanumeric codes. Access codes may be determined in one or more ways. For example, an access code may be generated based on an algorithm which creates a string of digits that may be verified through a checksum, as is known in the art. In another embodiment, an access code may be selected from a list of sequential numeric codes or otherwise selected from a database of previously established codes.

It should be noted that in one or more embodiments access codes might be suggested or provided by a customer. For example, a customer may provide a credit or debit card number, a social security number, a biometric identifier, a vending machine account or membership identifier, or the like. It should be noted that in some embodiments, access codes might not be necessary and/or preferred. For example, in one or more embodiments, a customer may establish a first communication link between a vending machine and the customer device, and the customer may proceed to request and/or pay for network service through the customer device. In such an embodiment, a vending machine or computer associated therewith may restrict access to a communications network to customers who have paid for such access via a first communications link.

In embodiments where an access code is required and/or desirable, the method 500 may continue by receiving an indication of the communication session activation code, at 508. Upon receiving the code (e.g., via the vending machine, e-mail, and/or as indicated by a dispensed product), for example, a customer may enter the code into the vending machine to initiate and/or redeem Wi-Fi access. In some embodiments, the customer may provide and/or indicate the code at a later date and/or time (such as by returning to the vending machine, and/or by interfacing with another vending machine associated with the first vending machine). The code may be received directly (e.g., through a keypad) or indirectly (e.g., through a customer device). The received access code may be temporarily stored in RAM pending an evaluation, verification, and/or authorization.

According to some embodiments, the access code may be validated. The vending machine and/or remote device or computer may attempt, for example, to validate the access code received from the customer at 508. In one embodiment, the vending machine and/or remote device or computer attempts to validate the access code by comparing the one received to the one issued (and temporarily stored in RAM). Should the presented access code match the issued access code, the process may continue, otherwise Wi-Fi access may be denied. In one embodiment, the vending machine and/or remote device or computer performs a checksum validation, as is known in the art. Should the presented access code pass a checksum validation, the process may continue, otherwise Wi-Fi access may be denied.

In another embodiment, the vending machine and/or remote device or computer compares the access code provided by the customer to one or more access codes stored in a local or remote database. If the access code matches a (valid) code in the database, the process may continue. In one or more embodiments, access codes may be determined to be valid if there is sufficient value remaining in an associated account or database record (e.g., thirty (30) minutes of Wi-Fi access time remaining). In one or more embodiments, validating an access code may comprise checking a username and/or password against a database of valid usernames and/or passwords, in an manner known in the art.

According to some embodiments, the method 500 may continue, such as in the case that an appropriate access code is received and/or validated, by establishing a communication session between a device associated with the customer and a remote network device. As described herein, for example, the customer may be provided with Wi-Fi access via the vending machine (and/or such access may be facilitated and/or initiated by the vending machine). It should be noted that while the term "Wi-Fi" is used throughout this disclosure to generally describe the network access provided to customers, any form, type, and/or configuration of network access may be provided. In other words, the term "Wi-Fi", while generally implicating a specific protocol and/or type of wireless connectivity, is used herein to refer generally to any type of network, including wired networks.

In some embodiments, other processes may also or alternatively be included in either of the methods 400, 500. According to some embodiments for example, the vending machine and/or remote computer or device may determine a price to charge a customer for one or more of network access and a physical product. In one or more embodiments, the price to be charged is dependent on a customer's status. Further, in one or more embodiments, the price to be charged is dependent on a customer's amount of network usage. Further still in one or more embodiments, the price to be charged is based on the identity, sales status and/or inventory status of one or more products, including a product selected by a customer. For example, network (e.g., Wi-Fi Internet) access may be priced lower if a customer selects a higher margin snack product. Or, network access may be "free" if a customer selects a Coca-Cola® product. By way of another example, network access may be free if current inventory of one or more items is above or below a certain threshold. Further network access may be free if sales volume of one or more products is above or below a certain threshold.

According to one or more embodiments, pricing may be based in whole or part on the amount of data (e.g., in bytes) downloaded to or uploaded from a customer device or vending machine. In embodiments where the price is determined prior to the customer's purchase and/or request for access, the price may accompany any offer for network access that is provided to the customer.

A. EXAMPLES

Some embodiments will now be described via exemplary implementations.

Example 1

In a first example, a customer may approach the vending machine (e.g., come within proximity thereto). The vending machine may then output, via an LCD display and/or other output device for example, an offer reading "Have a Bluetooth™ enabled cell phone? Get 10 minutes of Voice-over-IP (VoIP) with any snack purchase." The customer may then, according to some embodiments, depresses a "YES" button (not shown) associated with the vending machine, to indicate a desire to accept the offer. In some embodiments, the vending machine may then instruct the customer to purchase a snack (and/or other product from the vending machine). Upon depositing cash and/or coin (and/or otherwise providing payment), the customer may then select one or more desired snack items, which may then be dispensed by the vending machine. According to some embodiments, the snack item may indicate an access code. An indication of an access code may be affixed to the snack item's packaging via a sticker, for example. The vending machine may then wirelessly connect, via Bluetooth™ protocol for example, with customer's cellular phone. In some embodiments, the customer then enters, into cell phone's keypad, the alpha-numeric access code printed on sticker affixed to snack package. The customer's cell phone may then wirelessly transmit the access code to the vending machine, causing the vending machine to receive the access code. The vending machine may then, according to some embodiments, validate the access code by comparing received access code to codes stored in a database. The vending machine may then connect with a VoIP service provider server, and permit the customer to access the VoIP service for ten (10) minutes via the customer's cell phone. The customer can either dial phone number using cell phone or dial the number through a vending machine interface.

Example 2

(1) Customer approaches vending machine.
(2) Static (painted) sign on vending machine reads: "WiFi access just $5 for 30 minutes. Enter code A99 and deposit $5 or swipe credit card."
(3) Customer enters code A99 on vending machine's keypad and swipes credit card.
(4) Vending machine processes credit card payment.
(5) Vending machine prints access code with receipt printer and dispenses printed receipt.
(6) Vending machine wirelessly connects with customer's personal computer.
(7) Customer enters access code into personal computer (when prompted).
(8) Customer's personal computer wirelessly transmits access code to vending machine.
(9) Vending machine receives access code.
(10) Vending machine validates access code by comparing received access code to codes stored in a database.
(11) Vending machine connects with Internet Service Provider server.
(12) Vending machine permits customer to access Internet for 30 minutes via his personal computer.

Example 3

(1) Customer approaches vending machine.
(2) Static (painted) sign on vending machine reads: "WiFi access just $5 for 30 minutes."
(3) Vending machine wirelessly connects with customer's personal computer.
(4) Customer is prompted on computer screen for credit card number.
(5) Customer enters credit card number, which is transmitted to vending machine.
(6) Vending machine processes credit card payment.
(7) Vending machine connects with Internet Service Provider server.
(8) Vending machine permits customer to access Internet for 30 minutes via his personal computer.

B. Alternate Embodiments

According to an embodiment, access codes may be generated and printed access code onto labels. Such labels may be individually detachable (e.g., detachable from a plastic substrate to which the labels are adhesively attached) and attachable to cans/bottles and other items that are dispensable from a vending machine.

For example, a plurality of access codes may be generated (e.g., as described herein). A number of the generated access codes may be printed onto a corresponding number of labels (e.g., blank white labels) which are disposed on an 8½"×11" sheet of specialized label substrate, such as those sold by Avery-Dennison Corp. of Pasadena, Calif. For example, one appropriate product sold by Avery-Dennison Corp. is the Avery® Label 5160, which includes on each sheet thirty 2.625"×1" address labels. Each such label is white with permanent adhesive and printable by both laser and inkjet printers. Accordingly, such a sheet of labels may be fed into a suitable printer, and the printer is driven by appropriate software (e.g., a word processor that generates documents to be printed on the label sheet) to print access codes onto the labels. It will be apparent to one of ordinary skill in the art that labels of any shape or configuration may be used.

Besides labels that may be printed by printers such as laser printers and ink jet printers, a variety of other known devices may print labels onto different substrates. For example, the Avery® 9100 Personal Label Printer may be employed to print labels and/or peel labels before they are dispensed.

Labels are typically adhesively attached to a substrate (e.g., a plastic substrate) and the labels may be detached therefrom by, e.g., peeling the label from the substrate. Labels may be peeled by hand, or with the assistance of known apparatus such as label dispensers (e.g., the Avery® Quick Peel™ Automatic Label Peeler, Avery® 6216 Multi-Purpose Label Dispenser).

Labels which are printed with access codes are detached and applied to products which are dispensable by the vending machine, e.g., during the restocking of the vending machine. In one embodiment, the labels are applied to the "back" of products that are visible from outside the vending machine, thereby preventing the label (and codes thereon) to be seen by a person who has not purchased the product that bears the label.

In one embodiment the printed labels are obscured by, e.g., another label detachably affixed to the label that bears the access code. Thus, until the upper label is removed the access code on the lower label is not visible. In one embodiment, labels that bear access codes are applied or applicable to products in a manner which (a) does not render the access codes visible to "viewers" who have not acquired the product (e.g., customers waiting at the vending machine), and/or (b) minimizes the risk that the vending machine stocker will simply take the access codes.

In an embodiment, after an access code is used (e.g., to gain access to a WiFi network for a period of time through a vending machine), various information regarding such use may be recorded (e.g., in a database that is accessible to vending machines). For example, after an access code is used, any or all of the following may be stored: (i) the vending machine(s) at which the access code was used, (ii) the date and time the use of the access code was initiated, (iii) the date and time the use of the access code was discontinued.

In addition, since the vending machine at which the access code was acquired can be stored (e.g., a corresponding vending machine is assigned to a code when the access code is generated, when the code is applied to a product), the correlation between location of acquisition and location of use of access codes may be determined. Such stored information may be used to generate reports that indicate, e.g., access code trends by town, state, or other geographic region.

Since the time of acquisition of the access code can be stored (e.g., a corresponding vending machine is assigned to a code when the access code is generated, and the vending machine determines when a product bearing the code was sold), the delay between time of acquisition and time of use of access codes may be determined. Such stored information may be used to generate reports that indicate, e.g., access code trends by date, season, time, and/or by town, state, or other geographic region.

According to one or more embodiments, network access purchased from a vending machine may be accessed through other means, independent of a vending machine. For example, in an embodiment, a customer purchases network access from a vending machine, receives an access code, and then access a communications network using a computer at his or her house. In this manner, purchased network access can be, in a sense, "portable". Further, in this manner, network access purchased at a vending machine with cash can enable a customer to utilize a communications network anonymously.

According to one or more embodiments, a vending machine may serve as a "repeater" of a wireless access point within its vicinity. Thus, the wireless access point may communicate with a vending machine, which itself serves as a wireless access point, thereby broadening the range of service.

According to one or more embodiments, access codes may be "renewed" by customers. Customer may renew access codes by purchasing one or more items from a vending machine.

According to one or more embodiments, customers may earn access to a communications network (e.g., earn "minutes") by purchasing one or more physical products from a vending machine. Thus, network access can be rewarded as a premium to vending machine customers who purchase a threshold number of products.

According to one or more embodiments, once a customer has transacted with a vending machine through a customer device, the vending machine may store, in a memory, an identifier associate with the customer device (e.g., a serial number, a software license number, a "cookie" file) so that the vending machine can identify the customer upon subsequent visits to the vicinity of the vending machine. In this manner, the vending machine may track purchase behavior, etc.

V. Rules of Interpretation

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments.

Neither the Title (set forth at the beginning of the first page of this patent application) nor the Abstract (set forth at the end of this patent application) is to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" means any one or more microprocessors, CPU devices, computing devices, microcontrollers, digital signal processors, or like devices.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A vending machine configured to wirelessly validate payment of a customer, comprising:
   a processing device;
   a wireless receiver device in communication with the processing device;
   a network device in communication with the processing device; and
   a non-transitory memory device storing instructions that when executed by the processing device, result in:
      receiving, by the vending machine and from a customer, an indication of a product for which a unit is desired to be purchased by the customer from the vending machine;
      receiving, by the wireless receiver device of the vending machine and from a portable electronic device of the customer, a wireless signal indicative of an account identifier of the customer;
      transmitting, by the network device of the vending machine and in response to the receiving of the wireless signal, an indication of the account identifier of the customer to a remote network device;
      receiving, by the network device of the vending machine in response to the transmitting and from the remote network device, an indication that a payment, by the customer and for the desired unit of the product, is validated; and
      providing, by the vending machine and in response to the indication of the payment validation, the unit of the product to the customer.

2. The vending machine of claim 1, wherein the instructions, when executed by the processing device, further result in:
   outputting, by the vending machine, an electronic signal that causes the wireless signal of the portable electronic device to be output by the portable electronic device.

3. The vending machine of claim 1, wherein the receiving of the indication of the product for which the unit is desired to be purchased by the customer from the vending machine is conducted by:
   receiving, by the wireless receiver device of the vending machine and from the portable electronic device of the customer, a wireless indication of the desired unit of the product.

4. The vending machine of claim 1, wherein the receiving of the indication of the product for which the unit is desired to be purchased by the customer from the vending machine is conducted via a customer interaction with an input device physically coupled to the vending machine.

5. The vending machine of claim 1, wherein the wireless signal indicative of the account identifier of the customer comprises an indication of a credit card account number.

6. The vending machine of claim 1, wherein the wireless signal indicative of the account identifier of the customer comprises an indication of an identifier of the portable electronic device of the customer.

7. The vending machine of claim 1, wherein the remote network device comprises a credit card processing server.

8. The vending machine of claim 1, wherein the vending machine further comprises a dispensing device in communication with the processing device and wherein the providing of the unit of the product to the customer comprises:
dispensing, by the dispensing device of the vending machine, the unit of the product to the customer.

9. The vending machine of claim 1, wherein the portable electronic device comprises a cellular telephone device.

10. A vending machine configured to wirelessly validate an account of a customer, comprising:
a processing device;
a wireless receiver device in communication with the processing device;
a network device in communication with the processing device; and
a non-transitory memory device storing instructions that when executed by the processing device, result in:
receiving, by the wireless receiver device of the vending machine and from a portable electronic device of a customer, a wireless signal indicative of an account identifier of the customer;
establishing, by the network device of the vending machine and in response to the receiving of the wireless signal, a communication session with a remote network device;
receiving, by the network device of the vending machine and from the remote network device, an indication that the account identifier of the customer is validated;
receiving, by the vending machine and from the customer, an indication of a product for which a unit is desired to be purchased by the customer from the vending machine; and
providing, by the vending machine and in response to the indication of the account identifier validation and the indication of the desired product, the unit of the product to the customer.

11. The vending machine of claim 10, wherein the instructions, when executed by the processing device, further result in:
outputting, by the vending machine, an electronic signal that causes the wireless signal of the portable electronic device to be output by the portable electronic device.

12. The vending machine of claim 10, wherein the receiving of the indication of the product for which the unit is desired to be purchased by the customer from the vending machine is conducted by:
receiving, by the wireless receiver device of the vending machine and from the portable electronic device of the customer, a wireless indication of the desired unit of the product.

13. The vending machine of claim 10, wherein the receiving of the indication of the product for which the unit is desired to be purchased by the customer from the vending machine is conducted via a customer interaction with an input device physically coupled to the vending machine.

14. The vending machine of claim 10, wherein the wireless signal indicative of the account identifier comprises an indication of a credit card account number.

15. The vending machine of claim 10, wherein the wireless signal indicative of the account identifier comprises an indication of an identifier of the portable electronic device of the customer.

16. The vending machine of claim 10, wherein the remote network device comprises a credit card processing server.

17. The vending machine of claim 10, wherein the vending machine further comprises a dispensing device in communication with the processing device and wherein the providing of the unit of the product to the customer comprises:
dispensing, by the dispensing device of the vending machine, the unit of the product to the customer.

18. The vending machine of claim 10, wherein the portable electronic device comprises a cellular telephone device.

* * * * *